United States Patent Office 3,227,711
Patented Jan. 4, 1966

---

3,227,711
PROCESS FOR N-FORMYL HYDANTOINS OF CEPHALOSPORIN C
Arthur A. Patchett, Metuchen, and Stanton A. Harris, Westfield, N.J., assignors to Merck & Co., Inc., Rahway, N.J., a corporation of New Jersey
No Drawing. Filed Jan. 15, 1962, Ser. No. 166,365
2 Claims. (Cl. 260—243)

This invention relates to heterocyclic base derivatives of hydantoin cephalosporin C compounds and more particularly, to an improved process for their preparation.

The antibiotic substance cephalosporin C and its preparation by fermentation of suitable species of cephalosporin has been described in the art. This antibiotic which has been found to have the following structure:

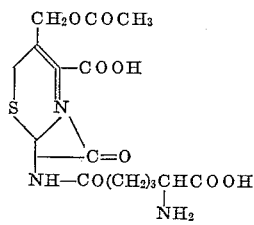

is active against both gram positive and gram negative bacteria.

Since cephalosporin C itself has relatively low activity, it has been the object of considerable research to provide cephalosporin C derivatives which have enhanced activity. It is now known that the heterocyclic base derivatives of hydantoin cephalosporin C compounds which have the following structure:

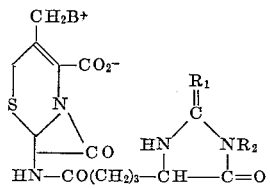

have the desired enhanced activity. In the above formula, B represents a heterocyclic base, such as pyridine, N-methylimidazole and the like, $R_1$ is oxygen or sulfur and $R_2$ is selected among hydrocarbon and hydrocarbon substituted groups, such as alkyl, aryl and the like.

Accordingly, it is an object of the present invention to provide an improved process for preparing heterocyclic base derivatives of hydantoin cephalosporin C compounds.

Other objects will be apparent from the detailed description of the invention which follows:

In accordance with the present invention, it is now found that heterocyclic base derivatives of hydantoin cephalosporin C compounds can be prepared by an improved process. The method of the present invention provides these compounds in much higher yields than have been achieved in the past. Specifically, the reaction sequence of the invention is as follows:

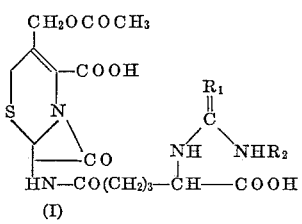

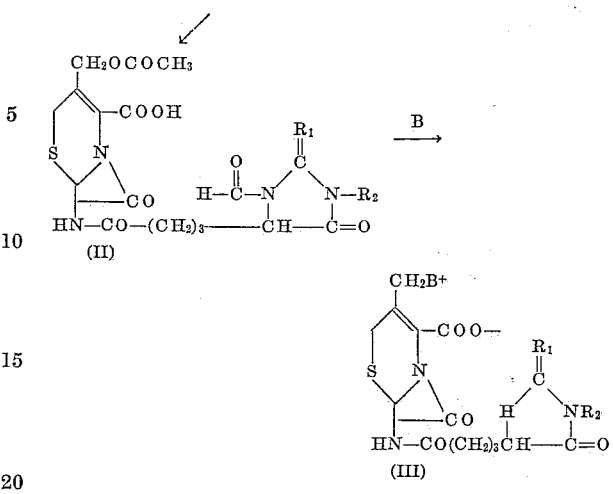

where B, $R_1$ and $R_2$ are as defined above.

The preparation of the starting material I is conveniently effected by intimately contacting the ester of isocyanic or thiocyanic acid with cephalosporin C in an aqueous medium in the presence of a mild base at room temperature. In carrying out this reaction, the isocyanic acid ester or the isothiocyanic ester is preferably added to the aqueous solution of a water soluble salt of cephalosporin C; the reaction being conveniently effected in the presence of a suitable water miscible organic solvent for the ester such as dioxane and the like. Alternatively, a solution of the isocyanic or isothiocyanic ester in a suitable water miscible solvent can be added to the aqueous solution of cephalosporin. After the completion of the reaction, the desired N-carbamyl compound is recovered by acidifying the aqueous reaction mixture or by extracting the acidified mixture with a water immiscible solvent for the acid such as butanol. If desired, the carbamyl compound can be further purified by crystallization from suitable solvents or solvent mixtures in accordance with procedures well known in the art.

In general, substituted or unsubstituted alkyl, aryl or aralkyl esters of isocyanic acid or isothiocyanic acid wherein the alkyl, aryl or aralkyl group preferably has a chain length of from one to ten carbon atoms is utilized in accordance with the foregoing procedures to produce the corresponding hydantoin derivatives of cephalosporin C. Examples of suitable esters that might be mentioned include alkyl esters such as methyl, ethyl, propyl, butyl, hexyl, heptyl and the like, aryl esters such as phenyl, napthyl and the like, and aralkyl esters such as benzyl, phenylethyl and the like. These alkyl, aryl and aralkyl groups can contain other substituents such as halogen and nitro substituents.

Ring closure of the N-carbamyl starting compound is then effected by reaction with a mixed formic anhydride acylating agent in the presence of a tertiary amine base which simultaneously introduces a formyl group at the nitrogen in the hydantoin ring, as indicated by the formation of compound II in the above described reaction sequence. The presence of an N-formyl group is particularly advantageous since it can be readily removed during subsequent reactions in which the desired heterocyclic base derivative is formed. The formylating agent is most conveniently prepared from a mixture of formic acid, acetic anhydride and pyridine, although other lower anhydrides and other tertiary amine bases may be used as well. This mixture provides a mixed formic-acetic anhydride as the reacting species. At the completion of the reaction the formyl acylated hydantoin derivative is recovered by removing the solvent under reduced pressure, dissolving the residue in water, acidifying the aqueous solution, extracting the acylated hydantoin with a water immiscible solvent, and concentrating the resulting extracts.

The formyl acylated hydantoin II, obtained in accordance with this process step is then further reacted with heterocyclic bases to produce the desired corresponding heterocyclic base derivatives of the hydantoin of cephalosporin C compound III. Thus, for example, upon reacting the N-formyl hydantoin of cephalosporin C with pyridine in aqueous solution, the corresponding pyridinium desacetoxy hydantoin of cephalosporin C is obtained.

While pyridine is a preferred heterocyclic base in this step, other heterocyclic bases, including alkylated derivatives of pyridine, such as collidine and lutidine, as well as N-methylimidazole, pyrazole, quinoline 3 and 4-amino-1,2,4-triazole, acridine and the like, may be used.

The compounds produced in accordance with the improved process of the present invention possess enhanced bacterial activity by way of being up to 100× more active against pathological bacteria than cephalosporin C. These compounds are therefore useful bacteriacidal agents which can be utilized for the sterilization of equipment and for the separation of microorganisms. These products are also useful as germicides in areas contaminated with microorganisms resistant to other antibiotics.

The hydantoin and acylated hydantoin compounds produced according to the improved process of the present invention are also herein after named as derivatives of propyl cephalosporin in accordance with accepted nomenclature. Thus, the phenylhydantoin of cephalosporin C is also referred to by the name 3-(3-phenylhydantoin-5-yl)-propylcephalosporin, the butylthiohydantoin by the name 3-(3-butyl-2-thiohydantoin-5-yl)propylcephalosporin, and the formylated phenylhydantoin by the name 3-(1-formyl-3-phenylhydantoin-5-yl)propylcephalosporin.

The following examples are illustrative of the methods by which the new compounds of this invention can be prepared.

EXAMPLE I

*The N-phenylcarbamyl derivative of cephalosporin C*

17 grams of the sodium salt of cephalosporin C are dissolved in 100 ml. of water with 3.4 g. of $NaHCO_3$. 100 ml. of purified dioxane is added and the stirred solution is treated dropwise with 5 ml. of phenylisocyanate (50% excess). After 5 minutes, precipitation of crystalline diphenyl urea occurs and after 15 minutes there is no longer any detectable odor of the isocyanate. The mixture is filtered and extracted three times with ether. The aqueous solution is treated with Darco G–60 and filtered through Filter-Cel. The bright colored solution is carefully acidified with 50% sulfuric acid to about pH 2 with seeding as soon as turbidity occurs. The thick white crystalline mass is filtered off and washed free from sulfuric acid. It is dried under vacuum at room temperature; final weight, 13.5 g. An analytical sample is prepared by recrystallization from acetone by spontaneous evaporation. The U.V. maximum was at 239 m$\mu$, E% 411 with a shoulder at 260 m$\mu$, E% 150.

EXAMPLE II

*3-(1-formyl-3-phenylhydantoin-5-yl)propylcephalosporin C*

A total of 28.5 g. of the recrystallized N-phenylcarbamyl derivative of cephalosporin C is dissolved in 250 ml. of 98% formic acid, treated with 50 ml. of pyridine with cooling in an ice salt bath. At 0–10° C., 100 ml. of acetic anhydride is added without further temperature rise. The ice bath is removed and after ½ hr. 150 g. of ice and water are added and the syrupy liquor concentrated in a rotary evaporator overnight. Upon addition of ice water, the syrupy concentrate is solidified, but becomes sticky upon attempted filtration. The total solution is acidified with sulfuric acid and extracted successively with methyl isobutyl ketone, butanol and chloroform. It is readily soluble only in the latter solvent. The solutions are thoroughly extracted with water to remove sulfuric acid and some formic acid. The solutions are concentrated separately and triturated with ether. No significant difference in IR is obtained amongst all fractions. The IR indicates the presence of a formyl substituent on the hydantoin ring. From 32.5 g. of the N-phenyl-carbamyl derivative of sephalosporin C, 29 g. of 3-(1-formyl-3-phenylhydantoin-5-yl)propylcephalosporin C is obtained.

EXAMPLE III

A solution of 25 g. of 3-(1-formyl-3-phenylhydantoin-5-yl)propylcephalosporin C in 180 ml. of pyridine and 1200 ml. of water is allowed to stand at 37° C. for 2½ days under nitrogen. Paper chromatography shows ultraviolet absorption at $R_f$'s of .32–.34; .53–.57 and .76–.78 in butanol-acetic-water (4–1–5) mixture. This solution is concentrated in a rotary evaporator at 40° C. to a syrup which is triturated with acetone. The acetone extract contains 5 g. of cephalosporin C phenylhydantoin, while 17 g. of light yellow powder was left behind.

The solid is distributed in a Craig counter-current machine in butanol-acetic-water (5–1–4) with 100 ml. in each fraction. The addition of the solid causes the first two tubes to become homogeneous, but separation occurs thereafter. Forty transfers are made. Paper chromatography in butanol-acetic acid-water (5–1–4) is used to monitor the contents of the various tubes. Tubes 7–14 contain both degradation materials with $R_f$ .30–.38 and the desired product, pyridinium-desacetoxy-3-(3-phenylhydantoin-5-yl) propylcephalosporin C, with $R_f$ .51–.56, yield 1.9 g. Tubes 15–21 contain only the desired product with $R_f$'s ranging from .50 to .56. The yield is 2.3 g. Tubes 22–29 contain both pyridinium-desacetoxy-3-(3-phenylhydantoin-5-yl)propylcephalosporin C and some non-quaternized hydantoin with an $R_f$ of .76–.81, yield 0.8 g. Ten portions of top layers run off the machine yields 6.5 g. of crude cephalosporin C phenylhydantoins.

The pyridinium-desacetoxy-3-(3-phenylhydantoin-5-yl)-propylcephalosporin C from tubes 15–21 is characterized by M.P. 180–3° (decomp.) and by U.V. max. 257 m$\mu$, E% 192 and in the infrared by sharp bands at 5.65, 5.8 and 5.96$\mu$ and by lack of acetate absorption in the 8$\mu$ region. On electrophoresis at pH 4.5 the substance migrated slightly to the negative side.

*Anal.*—Calcd. for $C_{26}H_{25}N_5O_6S \cdot 2H_2O$: C, 54.64; H, 5.11; N, 12.25; S, 5.60. Found: C, 54.74; H, 5.09; N, 12.33; S, 5.94.

EXAMPLE IV

Following the procedure described in detail in the above examples and using collidine, lutidine, N-methylimidazole, pyrazole, quinoline, 3-amino-1,2,4-triazole, 4-amino-1,2,4-triazole and acridine in place of pyridine, there is produced the corresponding heterocyclic base compound.

EXAMPLE V

Following the procedure described in detail in the above examples and using phenylisothiocyanate in place of phenylisocyanate, there is produced the corresponding sulfur containing heterocyclic base compound.

EXAMPLE VI

Following the procedure described in detail in the above examples and using methyl, butyl, heptylisothiocyanates in place of phenylisothiocyanate there is produced the corresponding alkylated heterocyclic base compound.

While this invention has been described to certain embodiments thereof, it will be understood by those skilled

What is claimed is:

1. An improved process for preparing 3(1-formyl-3-phenyl hydantoin-5-yl)propylcephalosporin C which comprises reacting N-phenylcarbamylcephalosporin C with a mixture of formic acid-acetic anhydride in the presence of dry pyridine to form the desired product.

2. An improved process for preparing N-formyl cephalosporin hydantoins which comprises reacting an N-carbamyl derivative of cephalosporin C of the formula:

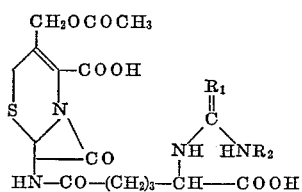

wherein $R_1$ is a member selected from the group consisting of oxygen and sulfur and $R_2$ is a member selected from the group consisting of alkyl groups having from one to ten carbon atoms, phenyl, naphthyl, benzyl and phenylethyl, with a mixture of formic acid and acetic anhydride in the presence of pyridine under anhydrous conditions to produce said N-formyl cephalosporin hydantoin of the formula:

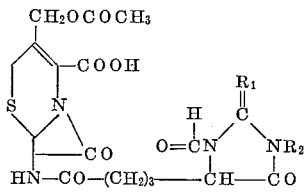

wherein $R_1$ and $R_2$ are the same as above.

References Cited by the Examiner
UNITED STATES PATENTS 3,029,236  4/1962  Steuble _____ 260—249.5
3,117,126  1/1964  Hoover et al. _____ 260—243

OTHER REFERENCES

Abraham et al.: "Ciba Foundation Symposium on Amino Acids and Peptides With Anti-Metabolic Activity," pages 205–223, pages 212–215 relied on (1958).

Bergman: The Chemistry of Acetylene and Related Compounds, page 80 (1948).

Hale: Biochemical Journal, vol. 79, pages 403–408, 1961.

Jour. American Medical Assoc., page 466, May 24, 1958.

Morton: The Chemistry of Heterocyclic Compounds, p. VI of the preface (1946).

Wertheim: Textbook of Organic Chemistry, pages 763–764 (1945).

NICHOLAS S. RIZZO, *Primary Examiner.*

JAMES W. ADAMS. *Assistant Examiner.*